(12) United States Patent
Iwaishi et al.

(10) Patent No.: US 7,409,419 B2
(45) Date of Patent: Aug. 5, 2008

(54) APPARATUS FOR CONTROLLING OUTPUTTING OF WEB DATA AND METHOD FOR OUTPUTTING WEB DATA

(75) Inventors: Akira Iwaishi, Kawasaki (JP); Tomohisa Shingai, Kawasaki (JP); Masayuki Kato, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 730 days.

(21) Appl. No.: 10/337,889

(22) Filed: Jan. 8, 2003

(65) Prior Publication Data
US 2003/0110304 A1 Jun. 12, 2003

Related U.S. Application Data

(63) Continuation of application No. PCT/JP00/04708, filed on Jul. 13, 2000.

(51) Int. Cl.
G06F 15/16 (2006.01)
G06K 1/00 (2006.01)

(52) U.S. Cl. .................. 709/202; 709/219; 358/1.15

(58) Field of Classification Search ......... 709/201–203, 709/219; 358/1.1, 1.15, 1.18; 715/527
See application file for complete search history.

(56) References Cited

U.S. PATENT DOCUMENTS

| | | | |
|---|---|---|---|
| 6,012,083 A * | 1/2000 | Savitzky et al. ............. | 709/202 |
| 6,061,700 A | 5/2000 | Brobst et al. | |
| 6,144,973 A * | 11/2000 | Fujii et al. ................. | 715/501.1 |
| 6,362,894 B1 * | 3/2002 | Shima ....................... | 358/1.15 |
| 6,615,234 B1 * | 9/2003 | Adamske et al. ............ | 709/203 |
| 6,757,749 B2 * | 6/2004 | Aoki et al. .................. | 710/5 |

(Continued)

FOREIGN PATENT DOCUMENTS

GB 2 328 300 A 2/1999

(Continued)

OTHER PUBLICATIONS

Supplementary European Search Report Application No. EP 00 94 6301 dated May 26, 2006.

*Primary Examiner*—Saleh Najjar
*Assistant Examiner*—David Lazaro
(74) *Attorney, Agent, or Firm*—Westerman, Hattori, Daniels & Adrian, L.L.P.

(57) ABSTRACT

An apparatus for controlling outputting of web data including: a receiving section (2) for receiving direction information of a direction to output web data, which direction information has been issued by a user; a web data obtaining section (3) for obtaining the web data that is processed into a web page which the user wishes to output on the basis of said direction information received in said receiving section (2); an output data creating section (4) for creating output data by extracting beneficial web data that is of benefit to the user from the obtained web data; and an output controlling section (5) for controlling the output device (15) to output the output data created by said output data creating section. With this apparatus for controlling outputting of web data, when web data processed into a web page provided on the Internet is to be output from the output device, it is possible for a user to obtain the output data in the convenient form to the user.

9 Claims, 16 Drawing Sheets

U.S. PATENT DOCUMENTS

| | | | | |
|---|---|---|---|---|
| 6,819,339 B1* | 11/2004 | Dowling | ................... | 715/738 |
| 7,085,801 B1* | 8/2006 | Abdelhadi et al. | .......... | 709/201 |
| 2002/0002592 A1* | 1/2002 | Aoki et al. | ................. | 709/211 |
| 2002/0026479 A1* | 2/2002 | Aoki et al. | ................. | 709/205 |
| 2002/0046238 A1* | 4/2002 | Estavillo et al. | ............. | 709/203 |

FOREIGN PATENT DOCUMENTS

| | | |
|---|---|---|
| GB | 2 332 543 A | 6/1999 |
| JP | 11-272440 | 10/1999 |
| JP | 2000-118085 | 4/2000 |

* cited by examiner

FIG. 5

| NAME | FAMILY NAME | | | GIVEN NAME | |
|---|---|---|---|---|---|
| DATE OF BIRTH | Year | Month | Day | | |
| GENDER | ● MALE  ○ FEMALE | | | | |
| SHIPPING ADDRESS | POSTAL CODE | | | | |
| | PREFECTURE ▼ | | | | |
| | CITY/WARD/TOWN/VILLAGE | | | | |
| | STREET/BLOCK/PINPOINT NUMBER | | | | |
| | CONDO/BLDG | | | | |
| | COMPANY/DEPARTMENT | | | | |
| TELEPHONE NUMBER | | | | | |
| FACSIMILE NUMBER | | | | | |
| E-MAIL ADDRESS (INPUT ONE MORE TIME) | | | | | |
| PAYMENT METHOD | ▼ | | | | |
| USER NAME | | | | | |
| PASSWORD (INPUT ONE MORE TIME) | | | | | |
| TOPIC OF INTEREST | | | | | |

| | BROWSING CLIENT SYSTEM | PRINT CONTROLLING SERVER SYSTEM | PRINT EXECUTION SERVER SYSTEM | INFORMATION PROVIDING SERVER SYSTEM |
|---|---|---|---|---|
| 1 | BROWSE | | | PROVISION |
| 2 | LOG IN | USER VERIFICATION | | |
| 3 | PRINT REQUEST | URL ACQUISITION | | |
| 4 | | PRINT DIRECTION | DIRECTION RECEPTION | |
| 5 | | | DATA OBTAIN | DATA DISCLOSURE |
| 6 | | | DATA CONVERT | |
| 7 | E-MAIL RECEPTION | | PRINT SPECIFICATION? | |
| 8 | SPECIFICATION ADJUSTMENT/ DETERMINATION | | CONFIRMATION RECEIPT | |
| 9 | | | PRINT | |
| 10 | RECEPTION | | DISPATCH | |
| 11 | | ACKNOWLEDGEMENT | COMPLETION NOTIFICATION | |
| 12 | BILL RECEPTION | PAYMENT APPLICATION | | |
| 13 | | REMITTANCE | RECEPTION | |

APPARATUS FOR CONTROLLING OUTPUTTING OF WEB DATA AND METHOD FOR OUTPUTTING WEB DATA

This application is a continuation of international application PCT/JP00/04708 filed on Jul. 13, 2000.

TECHNICAL FIELD

The present invention relates to an apparatus for controlling outputting of web data and a method for outputting web data suitable for an information terminal communicably connected to the Internet causing a printing machine to print web data (that is processed into a web page).

BACKGROUND OF THE INVENTION

The Internet includes a great number of computers communicably connected to each other. Information transferring and communication such as disclosure of web pages (home pages) that make use of an information dissemination system called WWW (world wide web), information exchange on news groups, and file distribution via FTP (file transfer protocol) in addition to e-mail intercommunication via e-mail, are performed over the Internet.

In recent years, electronic-commerce has also been carried out over the Internet. Further, the Internet deals with not only audio data that can be electrically distributed but also books requiring delivery by physical distribution. For example, a user refers to a catalog listing commodities in the form of a web page on the Internet and then purchases a desired commodity.

On the WWW, information (hereinafter called web data) processed into web pages is managed by a web server. When a user requests to browse a web page using a browser, the web server provides the user with the web data corresponding to the requested web page in response to the request. The user displays the provided web page on the monitor of a computer using software (browser) for browsing web pages, such as Netscape Navigator (brand name) or Microsoft Internet Explorer (brand name), or prints the web page on paper or the like using a print-output function equipped with the browser.

If the web data that the user has requested is a file described in an electronic document language called PDF (portable document format), a user at first downloads the PDF file from a data server arranged on the Internet and then displays/prints the downloaded PDF file using a dedicated application such as Adobe Acrobat Reader (brand name). Thereby the user obtains substantially the same output result as that displayed on the monitor.

However, such a conventional manner of outputting web data is not user friendly to deal with such data.

For example, a lot of pieces of web data generally have linkages to other web data in the form of hyperlinks, which often cause a complex hierarchical system of web data.

When particular web data is to be printed, a user may not obtain exactly the information required unless web data linked to that particular web data is printed.

Conversely, if all web data of the link destinations is printed, the printed results may include information unnecessary to the user, thereby wasting time and money. As a solution, a method has been proposed whereby only the web data a user truly requires is printed.

Further, when web data is to be printed on paper using a printer-output function of a browser, there is a problem that the printing result of the web data largely depends on the design of the web data to be printed.

For example, if a web page has white open-face characters displayed on a colored background is printed, the amount of ink consumption increases unnecessarily. Even if a background is white, letters in a pale color such as yellow have a low poor legibility and the printing result is therefore inconvenient for users.

When a user tries to directly read web data (a web page) displayed on a monitor, the user tends to comprehend the contents of the web data less when compared with reading the same web data printed on a medium, such as paper.

Especially, if the contents of the web data relate to logic (e.g., an academic article) and/or the contents are large in information volume, it is known that a user tends to comprehend the contents less. That's why the reading style of a user largely depends on the monitor. Additionally, lighting of the monitor and reflection on the monitor are considered as reasons.

If web data that a user wishes to use is in the form of a PDF file, downloading of the file from a server on the Internet requires a considerable length of time, thereby increasing communication cost. That boosts the cost to obtain the printing result. In addition, printing of a PDF file takes a disadvantageously long time.

The present invention is created with the foregoing problems in view. The object of the present invention is to provide an apparatus for controlling outputting of web data and a method for outputting web data, in which, when web data processed into a web page provided on the Internet is to be output from an output device, unnecessary web data is not printed and a user can confirm an appearance image of the output data in advance so that the user can obtain the output web data in a form convenient to the user.

DISCLOSURE OF THE INVENTION

To attain the above object, the present invention provides an apparatus for controlling outputting of web data, which is processed into a web page provided on the Internet, from an output device, the apparatus comprising: a receiving section for receiving direction information of a direction to output web data, which direction information has been issued by a user; a web data obtaining section for obtaining the web data that is processed into the web page which the user wishes to output on the basis of the direction information received in the receiving section; an output data creating section for creating output data by extracting beneficial web data that is of benefit to the user from the obtained web data; and an output controlling section for controlling the output device to output the output data created by the output data creating section.

Additionally, the output data creating section may comprise a page continuity checking section (41) for checking whether or not there is at least one web page that is continuous with the first-named web page, which the user wishes to output, and may create the output data by extracting at least one web page, as the beneficial web data, that is continuous with the first-named web page on the basis of the result of the checking performed by the page continuity checking section (41).

Further, the output data creating section may comprise a link importance checking section for checking whether or not one or more web pages linked to the first-named web page, which the user wishes to output, are important and may create the output data by extracting one or more web pages, which are linked to the first-named web page and which are determined to be important, on the basis of the result of the checking performed by the link importance checking section.

Furthermore, the apparatus may further comprise an output appearance image confirming section for confirming the appearance image of the output data, prior to the outputting of the output data from the output device, using the output data created by the output-data creating section, and may further comprise an output specification determining section for determining a specification to output the output data in accordance with the direction information received by the receiving section. Still further, the output device may be a printing machine.

The present invention provides a method for outputting web data, which is processed into a web page provided on the Internet, from an output device, the step comprising the steps of: receiving direction information of a direction to output the web data, which direction information has been issued by a user; obtaining the web data that is processed into the web page which the user wishes to output on the basis of the direction information received in the step of receiving; creating output data by extracting beneficial web data that is of benefit to the user from the web data obtained in the step of obtaining; and outputting the output data created in the step of creating from the output device.

Additionally, the method may further comprise the step of checking whether or not there is at least one web page that is continuous with the first-named web page, which the user wishes to be output, and the step of creating may be performed by extracting at least one web page, as the beneficial web data, that is continuous with the first-named web page on the basis of the result of the step of checking on continuity.

Further, the method may further comprise the step of checking the importance of one or more web pages linked to the first-named web page, which the user wishes to output, and the step of creating may be performed by extracting one or more web pages, as the beneficial web data, which are linked to the first-named web page and which are determined to have high importance, as the beneficial web data, on the basis of the result of the step of checking on importance.

Still further, the method may further comprise the step of, prior to the step of outputting, confirming the appearance image of the output data using the output data created in the step of creating, and may further comprise the step of determining a specification to output the output data in accordance with the direction information received in the step of receiving.

According to the above features of an apparatus of controlling outputting of web data and a method for outputting web data, it is possible to guarantee the following effective or advantageous results:

(1) When the web data is to be output, the output data is created by extracting the beneficial web data that is of benefit to the user so that output of unnecessary web data is inhibited and time and money required for the outputting can be saved.

(2) Since the web data is output on a medium such as paper, the web data is effectively utilized.

(3) The web data is created by extracting at least one web page, as the beneficial web page, that is continuous with the web page that the user wishes to output. If there is at least one web page that is continuous with the web page that the user wishes to output, the web page having continuity is surely included in the beneficial data and thereby service to the user can be improved.

(4) Since the output data is created, on the basis of importance of one or more web pages linked to the web page that the user wishes to be output, by extracting one or more web pages which are linked to the web page that the user wishes to output and which are determined to have high importance as the beneficial web data, it is possible for the output data to surely include web data processed into one or more web pages which are linked to the web page that the user wishes to output and which are determined to have high importance whereupon service to the user can be enhanced.

(5) It is possible to confirm the output appearance image of the output data prior to outputting of the output data so that data that the user does not wishes to output is inhibited from being output, thereby saving money and time for the outputting.

(6) A specification to output the output data can be determined in accordance with the direction information so that the user can obtain a desired output result whereupon service to the user is improved.

BRIEF DESCRIPTION OF THE DRAWINGS

FIG. 5 is a diagram showing an example of a web page provided by the print controlling server system;

FIG. 14 is a table showing a succession of procedural steps performed in each of the print controlling server system, the print execution server system, and information providing server system;

BEST MODE FOR CARRYING OUT THE INVENTION

An embodiment of the present invention will be described with reference to accompanying drawings.

Figure 1:
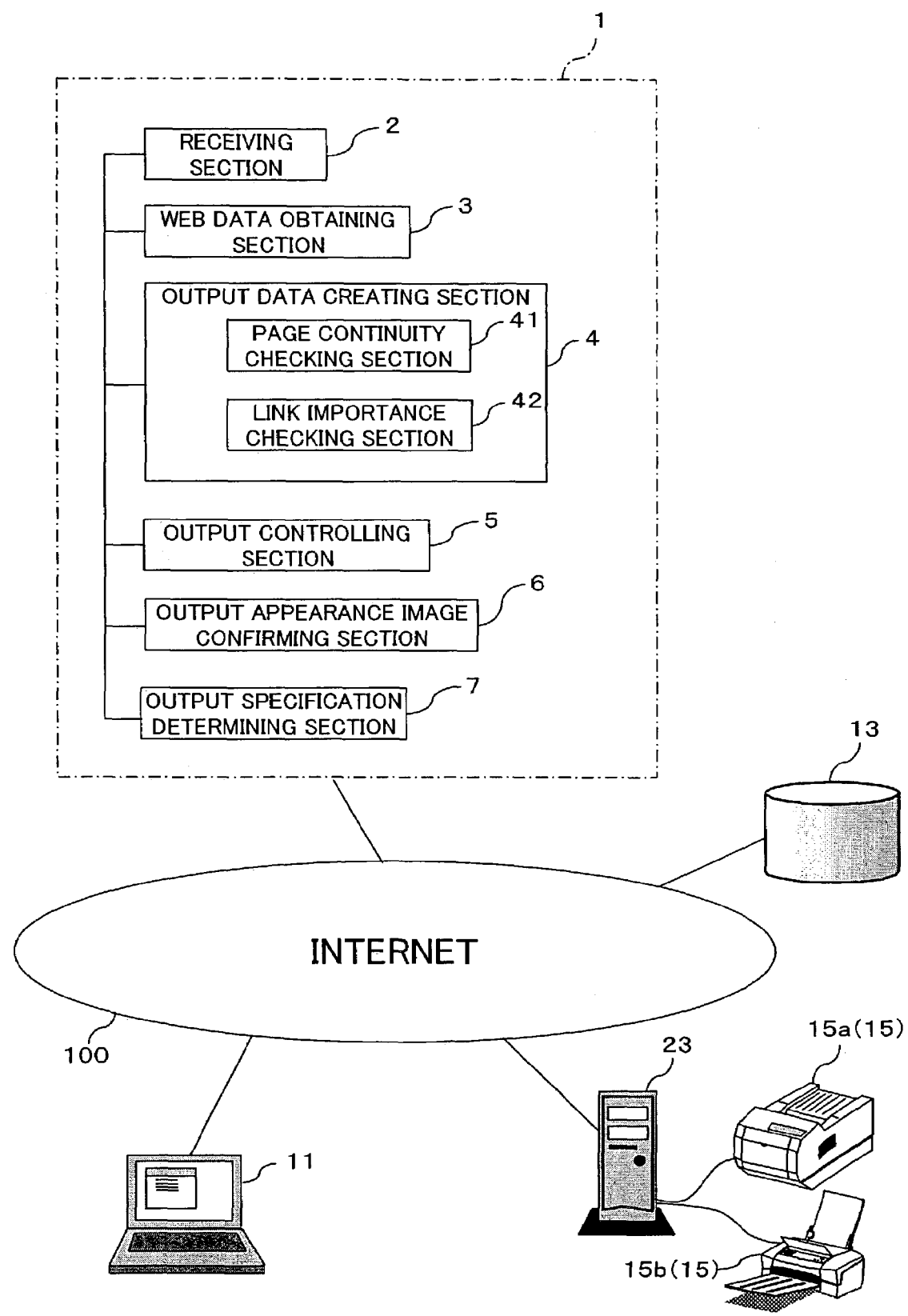
FIG. 1 is a block diagram schematically showing a functional configuration of an apparatus for controlling outputting of web data according to an embodiment of the present invention.
Figure 2:
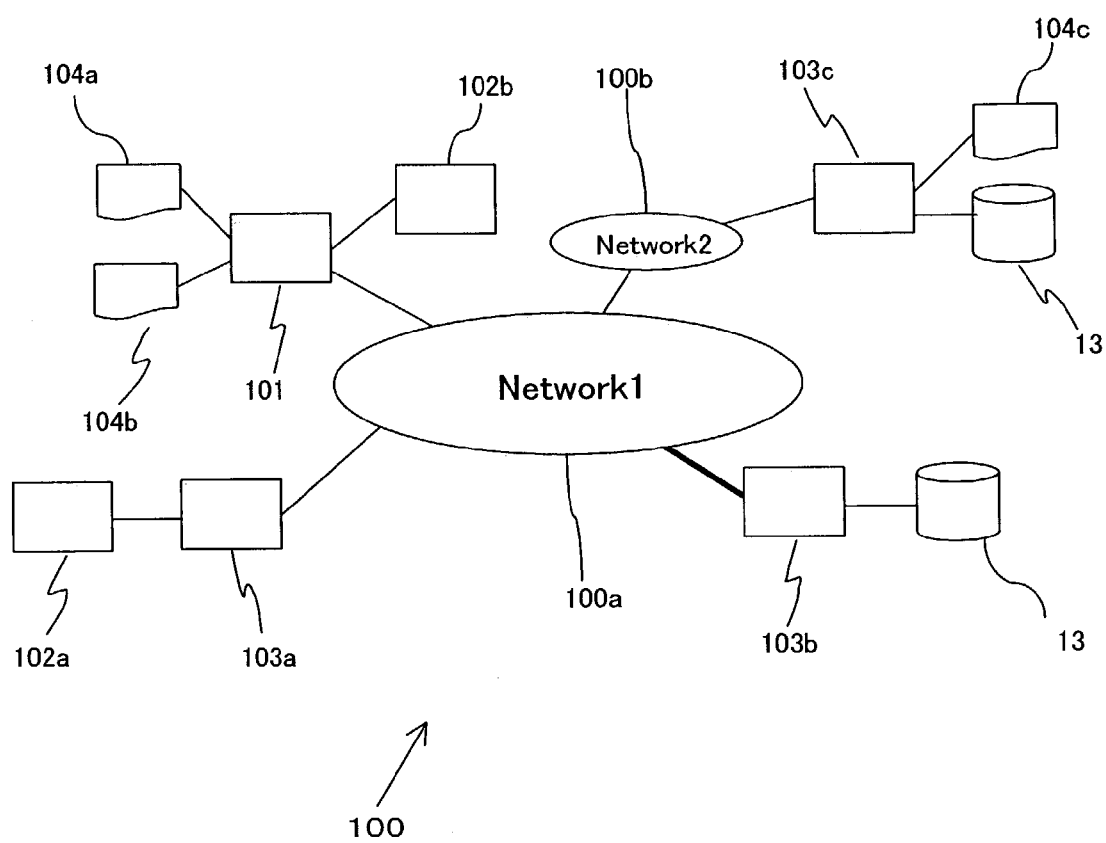
FIG. 2 is a diagram illustrating the arrangement of the apparatus for controlling of outputting of web data of the embodiment within the Internet.

FIG. 1 is a block diagram schematically showing a functional configuration of an apparatus for controlling outputting of web data according to the embodiment of the present invention; and FIG. 2 is a diagram illustrating an example of the arrangement of the apparatus for controlling of outputting of web data of the embodiment within the Internet.

Internet 100 includes a plurality of communication networks, such as a LAN (Local Area Network), WAN (Wide Area Network), or MAN (Metropolitan Area Network), which are communicably connected. For example, Internet 100 shown in FIG. 2 comprises browsing client systems 102a and 102b, print controlling server system 101, information providing server systems 103a to 103c and print executing server systems 104a to 104c, which are communicably connected, in addition to networks 100a and 100b.

In the following description, an arbitrary browsing client system will be indicated by the reference number 102 while a particular one of the plural browsing client servers is specified by reference number 102a or 102b.

In the same manner, any information providing server is indicated by reference number 103 however reference number 103a, 103b or 103c defines a particular one of the plural information providing server systems. Further, a particular one of the plural print executing server systems is defined by reference number 104a, 104b or 104c while an arbitrary print executing server system is specified by reference number 104.

Figure 3:
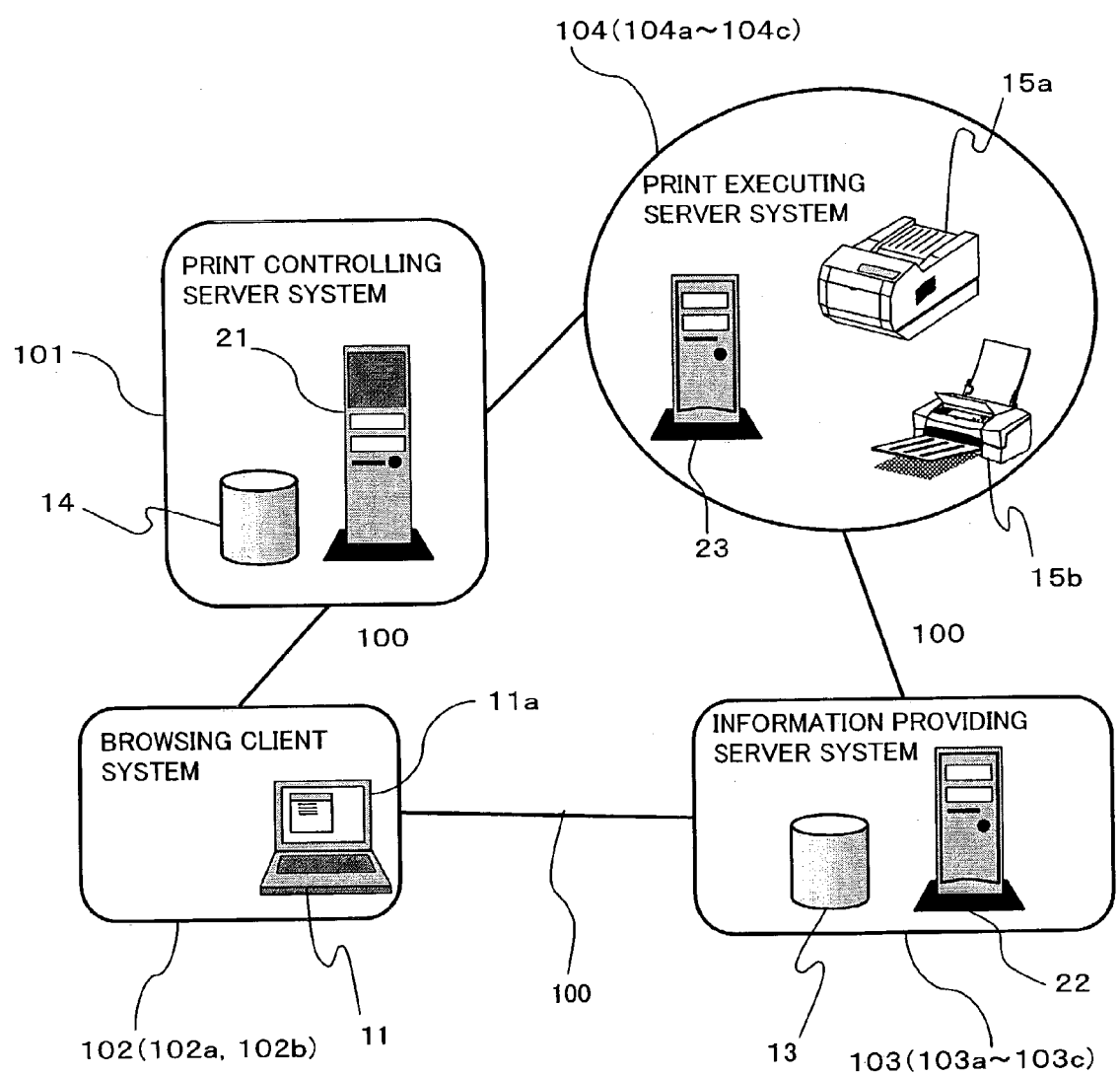
FIG. 3 is a block diagram showing a web-data outputting system including the apparatus for controlling outputting of web data of the embodiment.

FIG. 3 is a block diagram schematically showing a web data outputting system (hereinafter also simply called "system") including the apparatus (print controlling server system 10 and print executing server system 104) for controlling outputting of web data according to the embodiment of the present invention. The system comprises browsing client system 102, print controlling server system 101, information providing server system 103 and print executing server system 104.

Print executing server system 104 includes server computer 23 and printers 15a and 15b, and causes printers (an output device, a printing machine) 15a and 15b to print print data received from print controlling server system 101 that is to be described later in accordance with a direction from print controlling server system 101.

Each of printers 15a and 15b executes a printing operation in accordance with a print direction from print executing server system 104, in other words printers 15a and 15b are printing machines each of which executes printing operations in various ways that a user wishes. Each of printers 15a and 15b is exemplified by an ink-jet printer or an electro-photographic image forming apparatus.

An arbitrary printer is indicated by reference number 15 while a particular one of the plural printers is specified by reference number 15a or 15b.

For example, print executing server system 104 is run by a printing agent or the like under a contract with an agent that provides print controlling server system 101 described later.

Information providing server system 103 provides various kinds of information represented in web pages over the Internet, and is equipped with server computer 22. Hard disk 13 of server computer 22 retains web data processed into web pages.

Information providing server system 103 sends web data stored in hard disk 13 to browsing client system 102 or print controlling server system 101 in response to a request issued from browsing client system 102 or print controlling server system 101, respectively.

Browsing client system 102 is in the form of information terminal (e.g., computer) 11 in which a www browser (a web-page browsing application), such as Netscape Navigator or Microsoft Internet Explorer is installed. A user of information terminal 11 can browse web pages provided by information providing server system 103 on the monitor of the information terminal 11 using the www browser.

Print controlling server system (an apparatus for controlling outputting of web data) 101 includes server computer 21, which incorporates hard disk 14 that retains customer management database (not shown).

The customer management database stores therein information (customer information) about users that are granted to use the system so that information about users authorized to use the system is registered in the customer management database beforehand.

Figure 4:
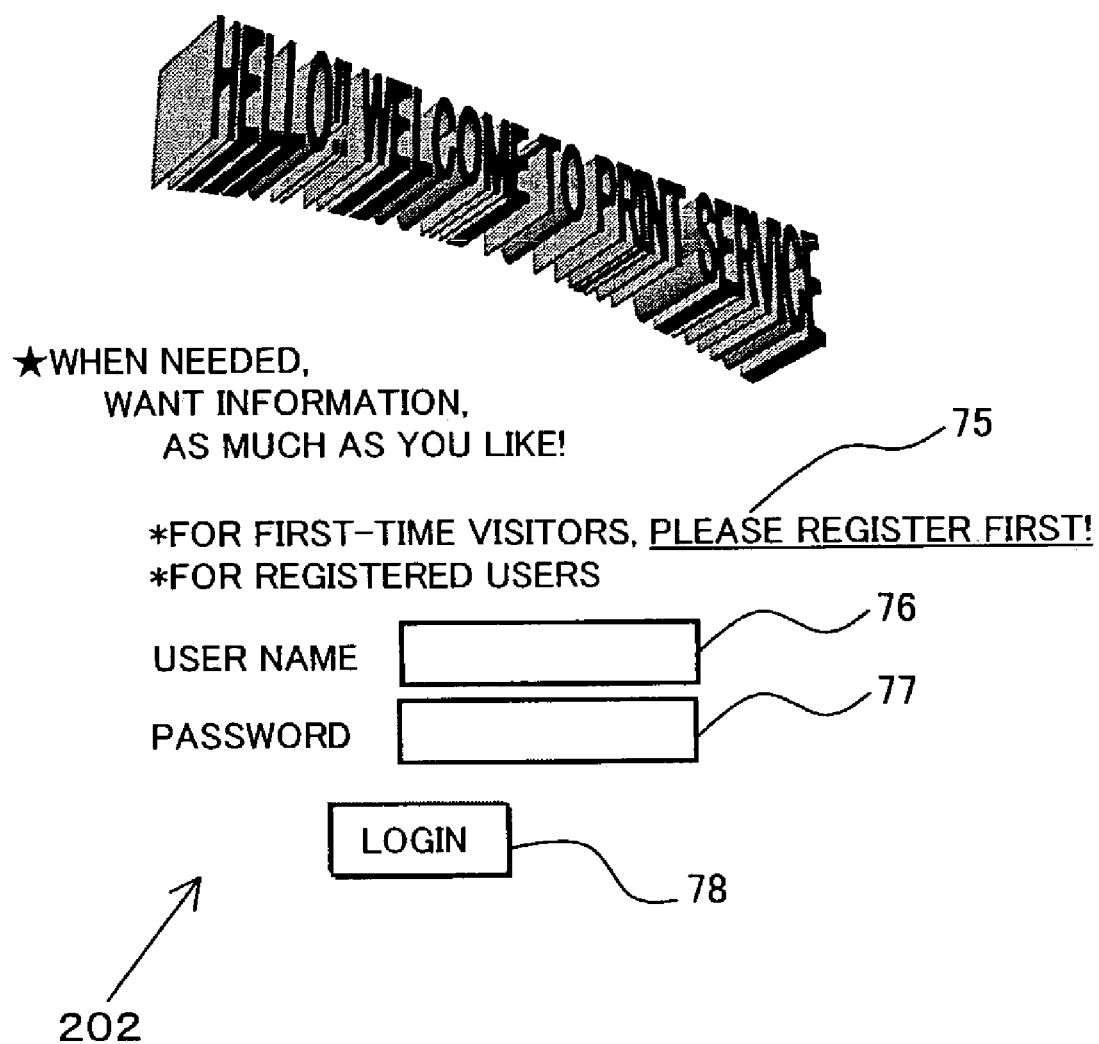
FIG. 4 is a diagram showing an example of a web page provided by a print controlling server system.
Figure 6:
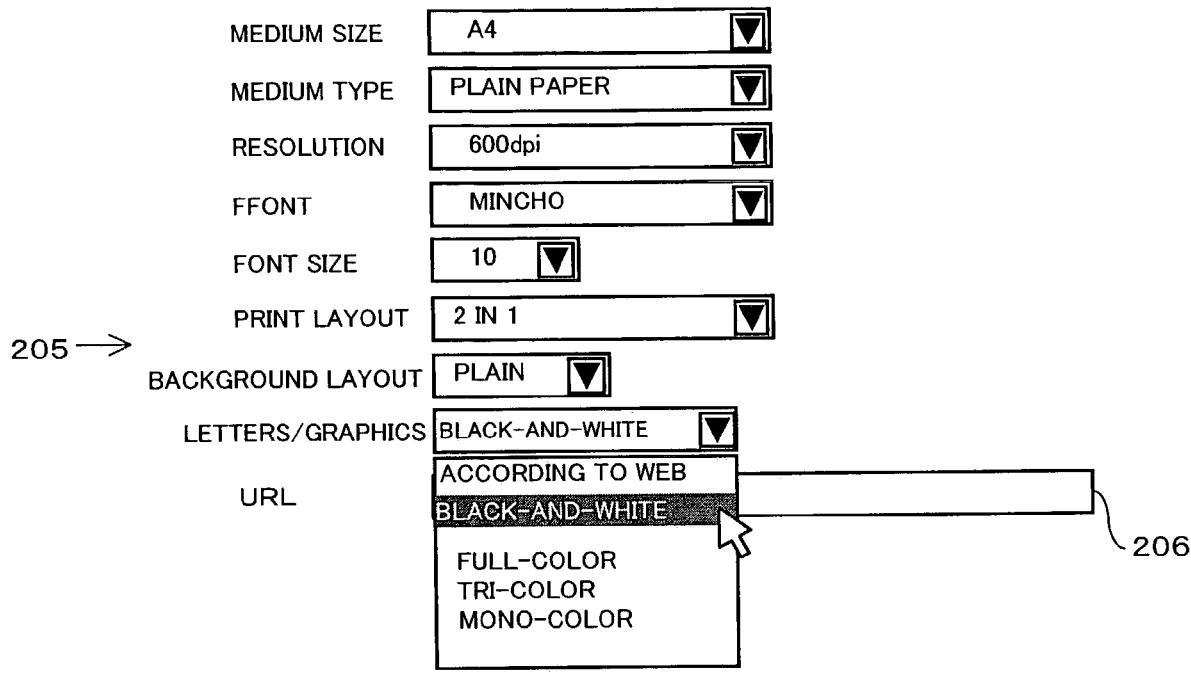
FIG. 6 is a diagram showing an example of a web page provided by the print controlling server system.

FIGS. 4 to 6 show examples of a web page provided by print controlling server system 101, respectively; FIG. 4 is an example of a log-in screen; FIG. 5, an example of a user registration screen displayed when a user is to be registered in the customer management database; and FIG. 6, an example of an input screen on which a user issues a direction for a printing operation.

Print controlling server system 101 also serves to function as a web server that provides web pages shown in FIGS. 4 to 6. A user accesses these web pages 202, 79 and 205, which are provided by print controlling server system 101, through Internet 100 with information terminal 11 of browsing client system 102.

Figure 11:
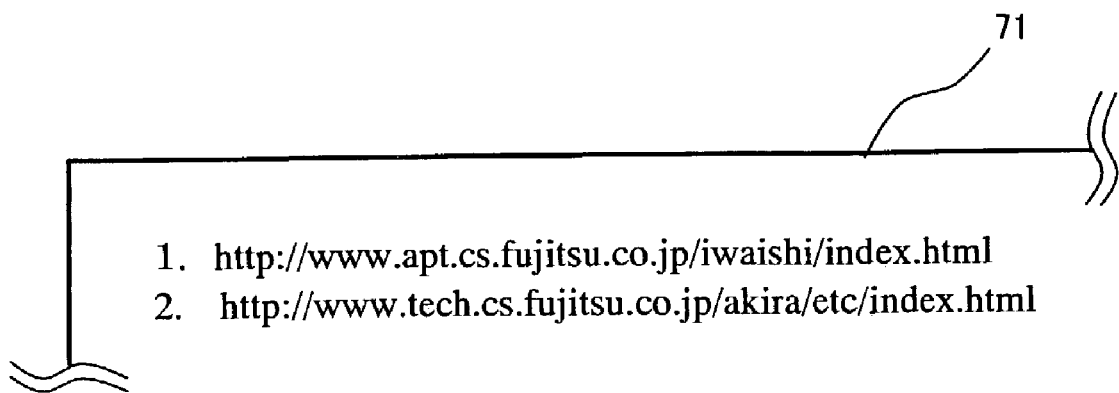
FIG. 11 is a diagram illustrating an example of a data list attached to print web data.

When a user accesses a web page provided by print controlling server system 101 using information terminal 11, print controlling server system 101 displays log-in screen 202 shown in FIG. 11 on monitor 11a of the information terminal 11.

On log-in screen 202, the user inputs the "user name" that has been already registered into user-name inputting portion 76 and also the "password" that has been already registered corresponding to the "user name" into password inputting portion 77 shown in FIG. 4. After that, a press of LOGIN button 78 by the user sends the input user name and the input password to print controlling server system 101.

Upon receipt of the user name and the password, print controlling server system 101 compares the user name and the password with information registered in the customer management database to thereby determine whether or not the user is authorized to use the system.

Further, link button 75 saying "please register!" on log-in screen 202 of FIG. 4 is linked to user-registration web page 79 shown in FIG. 5. When a user that intends to receive the service for the first time selects link button 75 saying "please register!" on log-in screen 202 of FIG. 4, print controlling server system 101 displays user-registration web page 79 shown in FIG. 5 on monitor 11a of information terminal 11.

According to an input format in web page 79 displayed on monitor 11a of information terminal 11, the user inputs personal information about himself/herself including name, date of birth, shipping address, telephone number, facsimile number, e-mail address, payment method, user name, password, and topic of interest to thereby complete user registration.

A user can set any "user name" and any "password" on web page 79. Further, a user may select any candidate as "prefecture" or "payment method" from information previously registered in print controlling server system 101.

Information that a user inputs for registration should by no means be limited to the above indexes. Alternatively, the information may include a usage environment (a hardware environment, a software environment) of user's information terminal 11. Various changes or modifications may be suggested without departing from the gist of the present invention.

Print controlling server system 101 registers the personal information of a user input in the above manner into the customer management database.

Besides the personal information that a user inputs on web page 79 of FIG. 5, information concerning utility fees when the user receives the service, a credit card number or the like, maybe registered in the customer management database.

Print controlling server system 101 compares the user name and the password that the user inputs on log-in screen 202 of FIG. 4 with information registered in the customer management database. If the input user name and password are determined to be identical to those in the customer management database, print controlling server system 101 displays web page 205 for a print direction shown in FIG. 6 on monitor 11a of information terminal 11.

According to web page 205 shown in FIG. 6, the user issues a print direction by inputting a URL of a web page which the user directs to print into URL input portion 206 in addition to print conditions of medium size, medium type, resolution, font type, font size, print layout, background layout, color of letters and graphics or the like.

The various pieces of information input on web page 205 are sent to print controlling server system 101 as web-data output direction information.

Color of letters and graphics can be selected not only between black/white and color but also additionally among full color, tricolor, and monocolor. Further, letters and graphics can be printed in color according to the web pages.

Print conditions should by no means be limited to the above examples and alternatives, such as both-side print, or integrated print, magnification/reduction print, may be suggested. Various other changes and modifications can be suggested without departing from the concept of the present invention.

Upon receipt of the print direction issued by the user, print controlling server system 101 searches, for example, print executing server system 104 nearest to the user's shipping address based on the address registered in the customer management data base and sends the above print conditions and the like to the searched print executing server system 104 to order execution of a print operation.

Print executing server system 104 controls printer 15 to print web data, which is processed into a web page provided on Internet 100. Print executing server system 104 obtains web data corresponding to a web page to be printed on the basis of the URL that has been input by the user on the input screen shown in FIG. 6 and that is received from print controlling server system 101. After that, print executing server system 104 extracts web data (beneficial web data) that is of benefit to the user from the obtained web data to thereby create output data (hereinafter called print web data)

Web data that is of benefit to a user represents one or more web pages (link destinations) linked to the original web page that the user wishes to be printed, and beneficial web data, for example, has the below relationships (1) to (3) with the original web page that the user wishes to be printed.

(1) Data on a web page located in the same domain as the original web page that the user wishes to be printed;

(2) Data on a (continuous) web page linked to the original web page that the user wishes to be printed with the presence of wording, such as "NEXT", "continued" and "go to next", that implies that the data is continuous with the original web page; and (3) Data on a web page in which the number of appearances of a particular key word (a technical term or the like) in the source (e.g., the HTML document) resembles that in a source of the original web page that the user wishes to be printed.

Print executing server system 104 extracts only web data that is of benefit to the user by extracting web data that suffices the above relationships (1) to (3) to thereby create output data.

When creating print web data, print executing server system 104 obtains the source (e.g., a file defined in terms of HTML (hypertext markup language) SGML (standard generalized markup language), XML (extensible markup language) or the like) of the original web page that the user wishes to print by inputting the URL of the original web page on the basis of the input URL.

After that, print executing server system 104 judges whether or not each web page linked to the original web page that the user wishes to print is located on the same domain as the original web page.

More specifically, print executing server system 104 obtains the URL of each linked web page and determines whether or not the domain of the linked web page is identical to that of the URL input by the user. Print executing server system 104 judges web data of a web page located on a different domain not to be important. Thereby, print executing server system 104 judges whether or not a linked web page has the above relationship (1).

Print executing server system 104 further analyzes the source of each of the linked web pages located on the identical domain as that of the original web page that the user wishes to print and checks continuity (page continuity) of the linked web pages in relation to the original web page based on the analyzed source.

Specifically, print executing server system 104 retrieves particular wording, such as "NEXT", "continues" and "go to next", that suggests that a web page continues in contents to another web page over the source of the original web page. If such wording is found, print executing server system 104 judges a web page that is linked to the web page with the presence of the wording as a web page (a continued web page) that has continuity (page continuity) in relation to the original web page. Print executing server system 104 determines whether or not a web page has the relationship (2) in the above manner.

After the determination, print executing server system 104 obtains and extracts web data of the continued web page as beneficial web data that is of benefit to the user and merges the beneficial web data with print web data.

Print executing server system 104 further checks the importance of each linked web page of a link destination based on the source thereof, and determines, based on the result of the checked importance, whether or not web data of the linked web page should be merged with print web data, i.e., whether or not the linked web page is of benefit to the user. Print executing server system 104 creates print web data by extracting linked web data representing one or more web pages that are determined to be important as beneficial web data and putting the extracted web data together.

The importance of each linked web page is determined in terms of the number of appearances of a particular key word in the linked web page resembling that in the original web page that the user wishes to print.

Print executing server system 104 counts the number of appearances of a particular key word (the appearance number) in the original web page that the user wishes to print, and also counts the number of appearances of the same key word in each linked web page located in the same domain as that of the original web page.

After that, print executing server system 104 compares the number of appearances of a key word in each linked web page with the number of appearances in the original web page. If the number in a linked web page resembles that in the original web page, print executing server system 104 determines that the linked web page also resembles in contents the original web page and thereby judges the linked web page is important. In this manner, print executing server system 104 determines whether or not web data has relationship (3) with the original web page.

A key word to be counted for importance checking may be previously determined or may be input by the user as required. A preferable key word is a less generally used word exemplified by a technical term or a proper noun. Further, importance checking may be performed based on not only one key word but also on two or more key words.

Among linked web pages that are linked to the original web pages that the user wishes to print, print executing server system 104 prints only linked web pages that have been judged to have high importance. When the original web page provides links to a plurality of web pages, print executing server system 104 prints only an important web page, as beneficial web data, from the plural linked web pages.

Print executing server system 104 makes a data list (see FIG. 11) of addresses (URLs) of web pages which are linked to the original web page and which, however, the user are not printed as beneficial web data because the web pages are located on different domains from that on the original web page or are not judged to be important.

Figure 9:
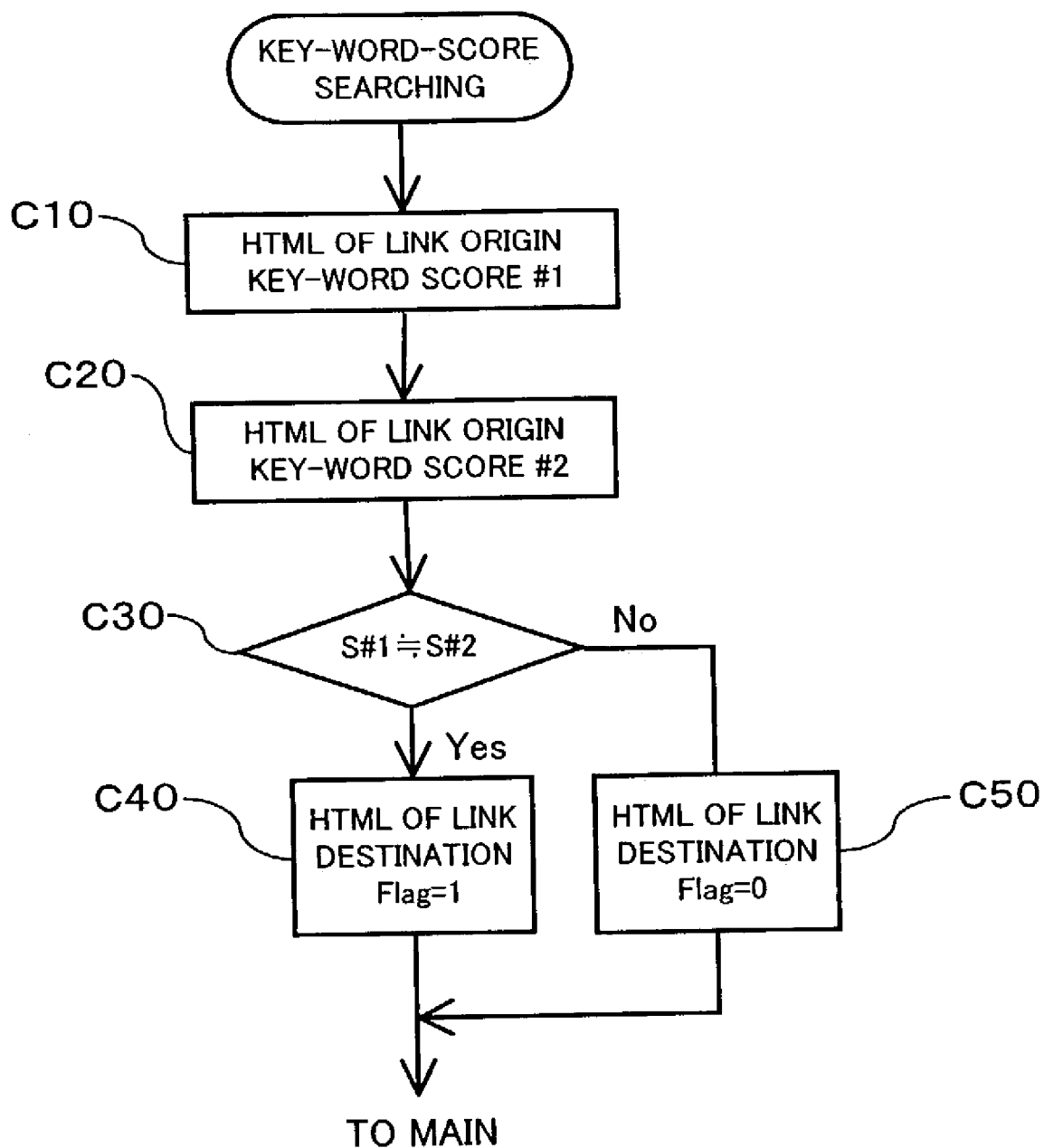
FIG. 9 is a flow diagram illustrating a succession of procedural steps of link-importance searching.
Figure 10A:
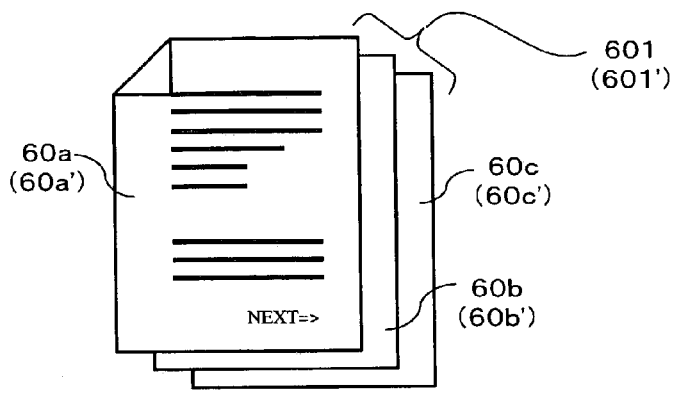
FIG. 10(a) is a diagram showing a manner in which a print execution server system creates print web data.
Figure 12:
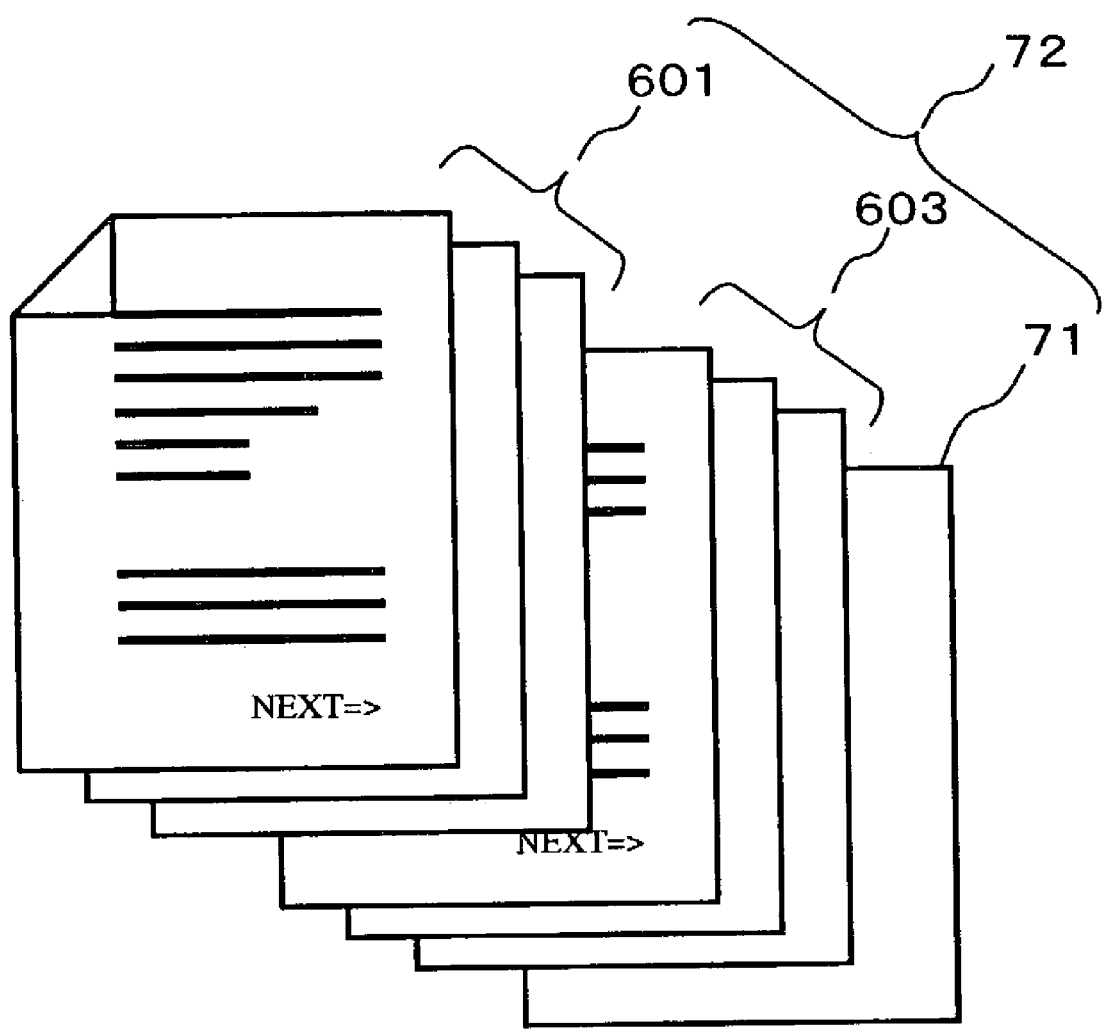
FIG. 12 is a diagram illustrating print web data.

FIGS. 10(*a*) and 10(*b*) are diagrams showing a manner in which the print execution server system creates print web data; FIG. 11 is a diagram illustrating an example of a data list attached to print web data; and FIG. 12 is a diagram illustrating print web data. A succession of procedural steps for creating print web data illustrated by flow diagrams of FIGS. 7 through 9 will now be described with reference to FIGS. 10 to 12.

Figure 7:
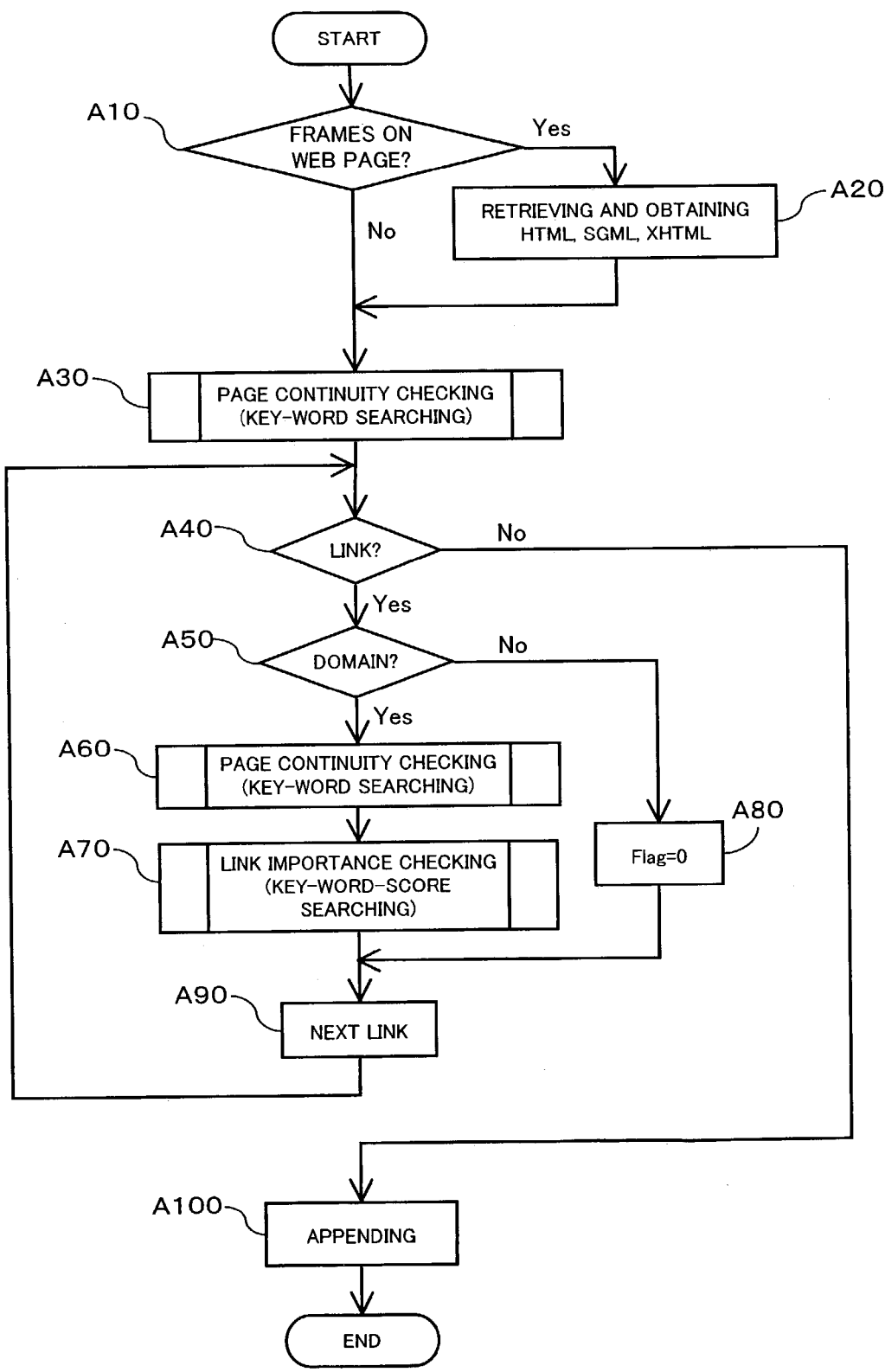
FIG. 7 is a flow diagram illustrating a succession of procedural steps of creating print web data.
Figure 8:
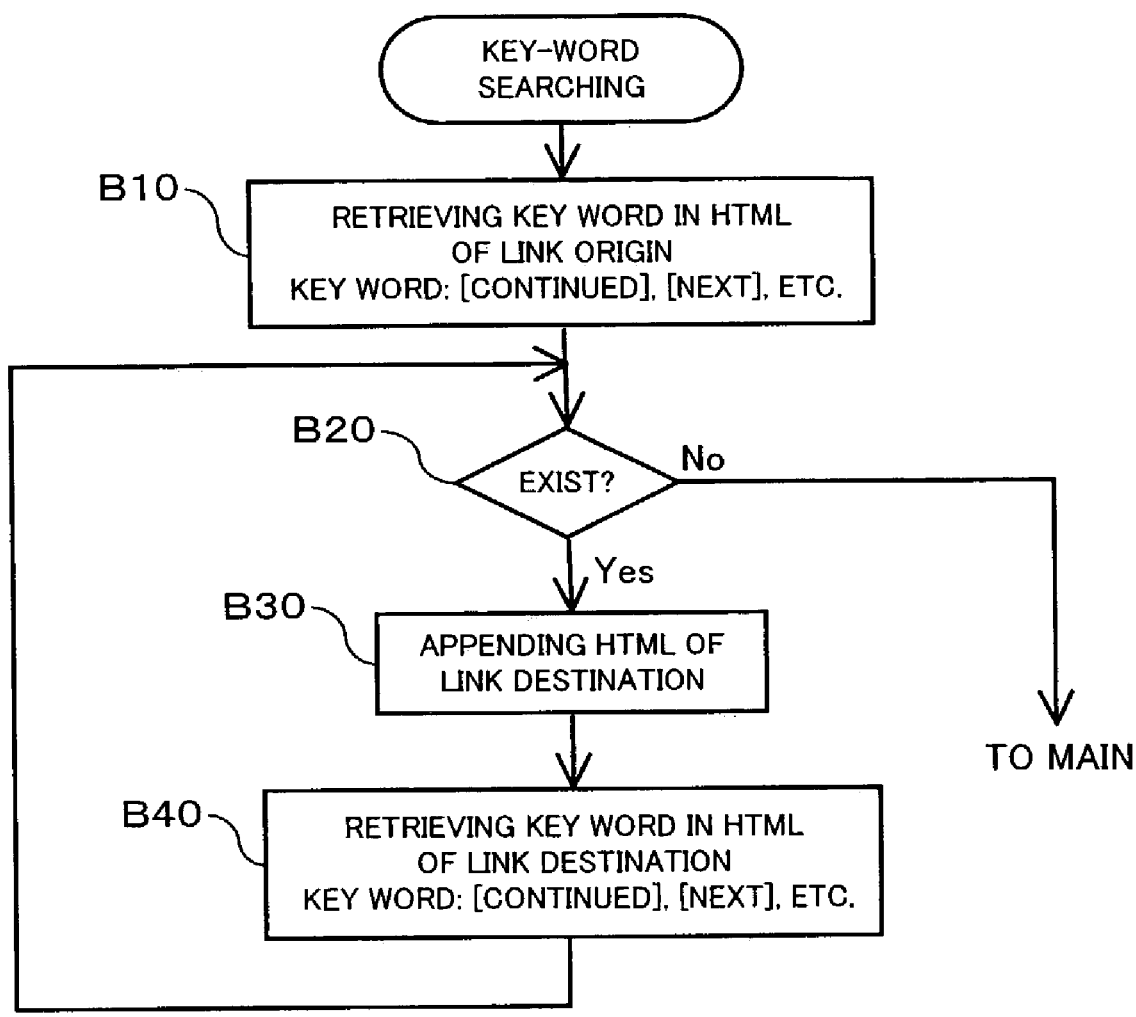
FIG. 8 is a flow diagram illustrating a succession of procedural steps of page-continuity searching.

FIG. 7 is a flow diagram showing a succession of procedural steps (the main flow; steps A10 to A100) of creating print web data; FIG. 8 is a flow diagram showing a succession of procedural steps (steps B10 to B40) of page-continuity searching; and FIG. 9 is a flow diagram showing a succession of procedural steps (step C10 to C50) of link-importance searching.

For example, successions of procedural steps will now be described, assuming that a user accesses a web page provided by information providing server system 103 from information terminal 11 through Internet 100 over browsing client system 102 and then directs web data 601' (hereinafter, print-directed web data 601') has been processed into web page 601 (hereinafter, print-directed web page 601) displayed on monitor 11*a* of the information terminal 11.

Hereinafter, a reference number created by attaching "'" to a reference number representing a web page represents web data processed into the corresponding web page.

As shown in FIG. 10(*a*), print-directed web data 601' consists of web data 60*a* through 60*c*. Web data 60*a* to 60*c* do not include frames as shown in FIGS. 10(*a*) and 10(*b*).

The user inputs the URL (direction information of a direction to output web data), at which print-directed web page 601 exist, to a web page (see FIG. 6) provided by print controlling server system 101 and then the input URL of print-directed web page 601 is notified to print controlling server system 101.

Print controlling server system 101 sends the URL input on the web page shown in FIG. 6 to print executing server system 104 and then print executing server system 104 accesses print-directed web data 601' (web data 60*a'*) to obtain the source (in HTML format, for example) thereof.

First of all, print executing server system 104 judges whether or not web data 60*a'* includes frames (step A10 in FIG. 7). If web data 60*a'* does not include frames (No route in step A10 of FIG. 7), print executing server system 104 performs page-continuity searching (key-word searching) over the source of web data 60*a'* (step A30 in FIG. 7).

On the other hand, if web data 60*a'* includes frames (YES route in step A10 in FIG. 7), print executing server system 104 obtains the source of each of the frames constituting web data 60*a'* and merges the obtained sources (step A20 in FIG. 7), which is to be subjected to page-continuity searching at step A30.

Here, page-continuity searching (key-word searching) will now be described with reference to flow diagram FIG. 8 (steps B10 to B40). Print executing server system 104 searches particular wording such as "go to next", "NEXT" and "continued" that implies that a web page continues to other pages at the source of object web data 60*a'* (step B10 in FIG. 8) to thereby judge whether or not the source includes such wording (step B20 in FIG. 8).

If such wording is found in the source (YES route in step B20 in FIG. 8; see reference number 63 in FIG. 10(*b*)), web data 60*b'* and 60*c'* that are linked to web data 63*a'* with the presence of such wording are judged to be web data continued to web data 60*a'*, in other words, beneficial web data. Whereupon, web data 60*b'* and 60*c'* are added to web data 60*a'* to thereby create continued web data 70 (see FIG. 10(*b*)) as an object data of printing.

Print executing server system 104 also obtains the source of each of the linked web pages (step B30 in FIG. 8), performs page-continuity searching over the obtained source (step B40 in FIG. 8) and then performs to step B20 again.

If no wording that implies page continuity exists in the source (YES route in step B20 in FIG. 8), the page-continuity searching is completed and the procedural steps move to step A40 in FIG. 7.

Next, print executing server system 104 checks whether or not continued web data 70 that has been created is linked to another web page (step A40 in FIG. 7). If combined web page 70 provides a link to another web page (YES route in step A40, see reference numbers 64-1 to 64-3 in FIGtime 10(*b*)), print executing server system 104 further judges whether or not the address of each web page (see reference number 602 to 604 in FIG. 10(*b*)) of a link destination is located on a domain identical to that on print-directed web page 60*a* (step A50 in FIG. 7).

Among web pages 602 to 604 shown in FIG. 10(*b*) web page 602 is located on a different domain from that of web page 60*a*; web pages 603 and 604 are located on a domain identical to that of web page 60*a*.

Here, when addresses of web pages 603 and 604 of link destinations are located on the same domain as that of print-directed web page 60*a* (YES route in Step A50 in FIG. 7), print executing server system 104 obtains the sources of link-destination web page 603 and 604 and then performs page-continuity searching (key-word searching) over the obtained sources (step A60 in FIG. 7).

Procedural steps of page-continuity searching performed in step A60 of FIG. 7 are identical to those described above with reference to flow diagram FIG. 8, so any repetitious description will be omitted here. If no wording (key word) that implies page continuity exists in a source (NO route in step B20 in FIG. 8) as the result of step B20 in FIG. 8 in the page-continuity searching at step A60 in FIG. 7, link-destination web pages 603 and 604 are subsequently subjected to link-importance searching (key-word-score searching) (Step A70).

Link-importance searching will now be described with reference to flow diagram FIG. 9 (steps C10 to C50) First of all, print executing server system 104 counts the number of appearances of a particular key word in web data 60a' based on the source of web page 60a of the link origin (step C10 in FIG. 9).

After that, print executing server system 104 counts the number of appearances of the particular key word in web data 602' based on the source of link-destination web pages 602 (step C20 in FIG. 9).

Print executing server system 104 compares the counts of appearances of the key word (step C30 in FIG. 9) and, if the counts are approximately the same (YES route in step C30 in FIG. 9), judges that link-origin web page 60a and link-destination web page 602 are similar in contents and then sets a print flag allocated to web page 602 to "1" (step C40 in FIG. 9). After that, print executing server system 104 checks a next link destination in relation to continued web data 70 (step A90) and returns to step A40 in FIG. 7.

Conversely, if the counts are not approximately the same (NO route in step C30 in FIG. 9), print executing server system 104 judges that link-origin web page 60a and link-destination web page 602 are not similar in contents and then sets the print flag allocated to web page 602 to "0" (step C50 in FIG. 9) and then moves to step A90 in FIG. 7.

When the address of a link-destination web page is not identical to the domain of print-directed web page 60a (NO route in step A50 in FIG. 7), print executing server system 104 sets a print flag allocated to the link-destination web page to "0" (step A80 in FIG. 7) and then performs step A90.

Link-importance searching may use one predetermined particular key word, or may use two or more predetermined particular key words to judge similarity of web pages on the basis of the plural key words. Further, the number of appearances of each word constituting a web page may be counted, and similarity may be judged in accordance with the usage pattern of all words.

Figure 10B:
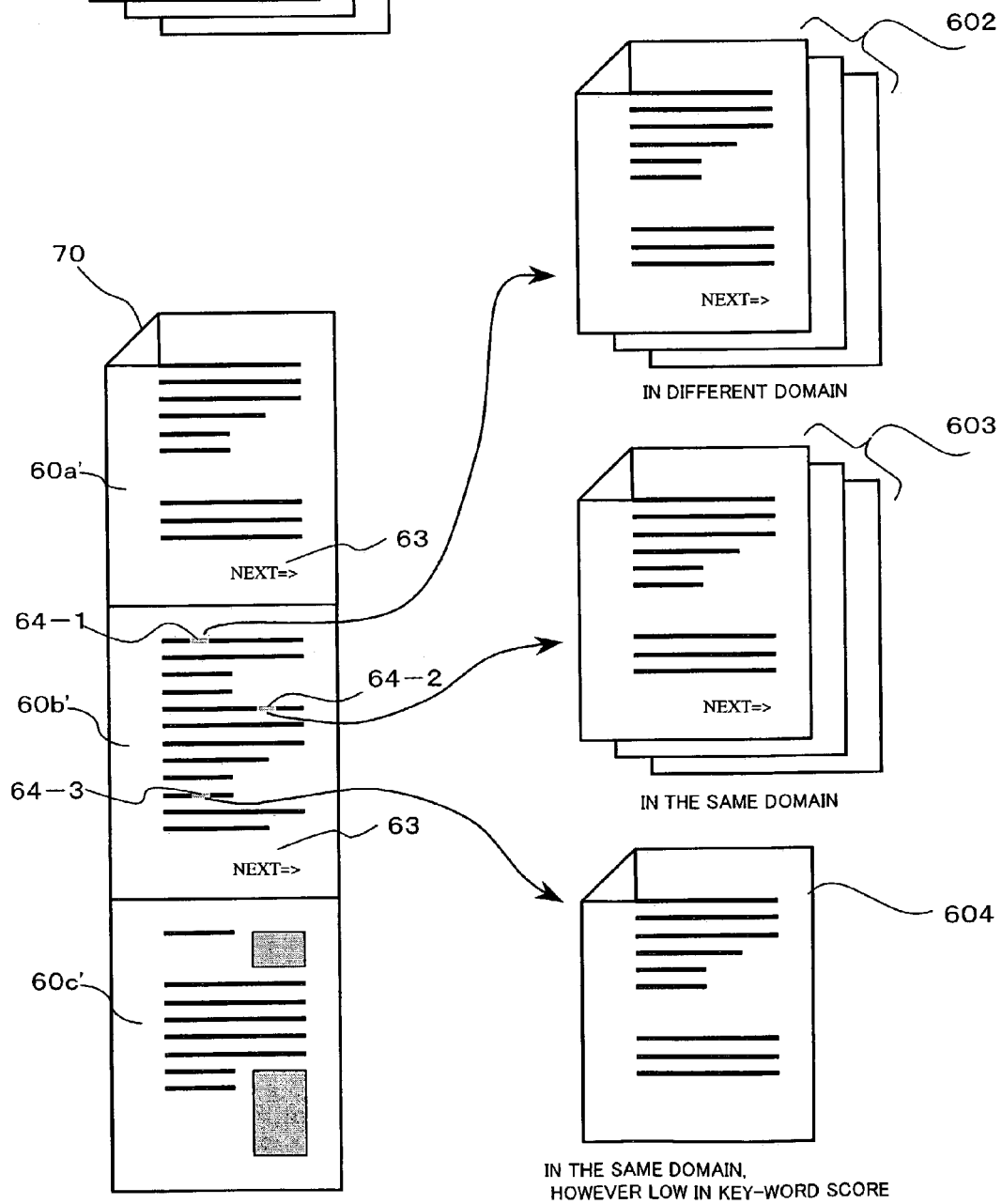
FIG. 10(b) is a diagram showing a manner in which the print execution server system creates print web data.

Among web pages 602 to 604 shown in FIG. 10(b), since the count of a key word in web page 604 is lower than that in web page 60a and a tendency of the counted number of web page 604 is not similar to that of web page 60a, print executing server system 104 judges that link-destination web page 602 is not similar in contents to link-origin web page 60a.

If continued web data 70 provides no more links (NO route in step A40 in FIG. 7), continued web data 603', whose print flag is set to "1", is appended to continued web data 70 whereupon print-directed web data 72' is created (step A100 in FIG. 7).

Namely, print executing server system 104 analyses the importance of each link-destination web page linked to the print-directed print page, and prints only important linked web pages, i.e., web pages whose print flag are set to "1". As a result, even if the print-directed web page provides links to a plurality of web pages, only one or more important web pages are printed as beneficial web data among the linked plural web pages.

At that time, print executing server system 104 creates attached data list 71 (see FIG. 11) that includes addresses (URLs) of web pages whose print flags are set to "0", i.e. web pages to which continued web data 70 provides links however which have not been merged into continued web data 70 because the web pages are located on different domains or are judged not to be important.

In the above manner, print executing server system 104 creates print web data 72 that is to be actually printed. Print web data 72' is, as shown in FIG. 12, formed by beneficial information 601 containing print-directed web data 60a' and web data 60b' and 60c' that have page continuity in relation to print-directed web data 60a', web page (link-destination information) 603 to which beneficial information 601 is linked and which are highly related to beneficial information 601, and attached data list 71 including addresses of link destinations with respect to the beneficial information.

Print executing server system 104 creates the print image (an output appearance image) of print web data 72 created in the above manner in the form of a web page, stores data of the print image on hard disk 14, and further notifies the user via e-mail 73 (see FIG. 13) to notify the URL of the web page.

Figure 13:
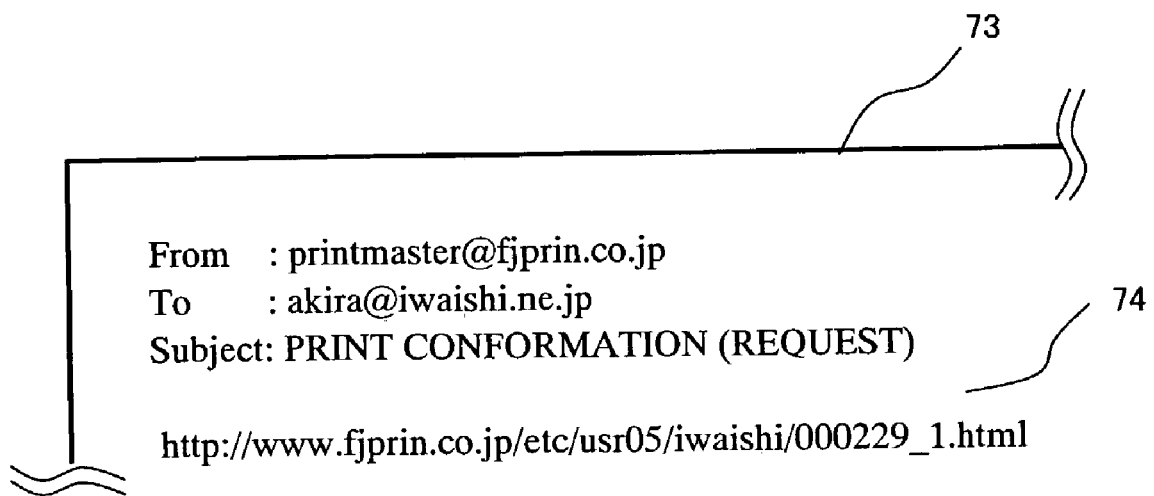
FIG. 13 is a diagram illustrating a part of an e-mail to be sent to a user from the print execution server system to notify the URL of a web page containing the print appearance image data.

FIG. 13 is a diagram illustrating a part of e-mail sent to the user from print executing server system 104 to notify the URL of a web page representing data of a print appearance image. As shown in FIG. 13, e-mail 73 sent from print executing server system 104 includes URL 74 of the created print image data. The user accesses URL 74 using browser from information terminal 11 to confirm the appearance image prior to printing the print web data.

If the user is satisfied with the result of the confirmation, the user directs print executing server system 104 to carry out printing. Conversely, if the user is not satisfied, the user can access print web data 72 with information terminal 11, delete an unnecessary portion or add other necessary web data. After such an adjustment, the user directs print executing server system 104 to carry out printing again and can thereby obtain desired printed data. This is economical because the possibility of acquiring an undesired result can be eliminated.

In the present embodiment, print executing server system 104 notifies the user of the URL on which data of a print image locates via e-mail, however the notifying method should by no means be limited to this. Alternatively, the URL of print image data is notified by being displayed on a web page or the like on which the user has issued the print direction, and various modifications can be suggested without departing the concept of the present invention.

Figure 15:
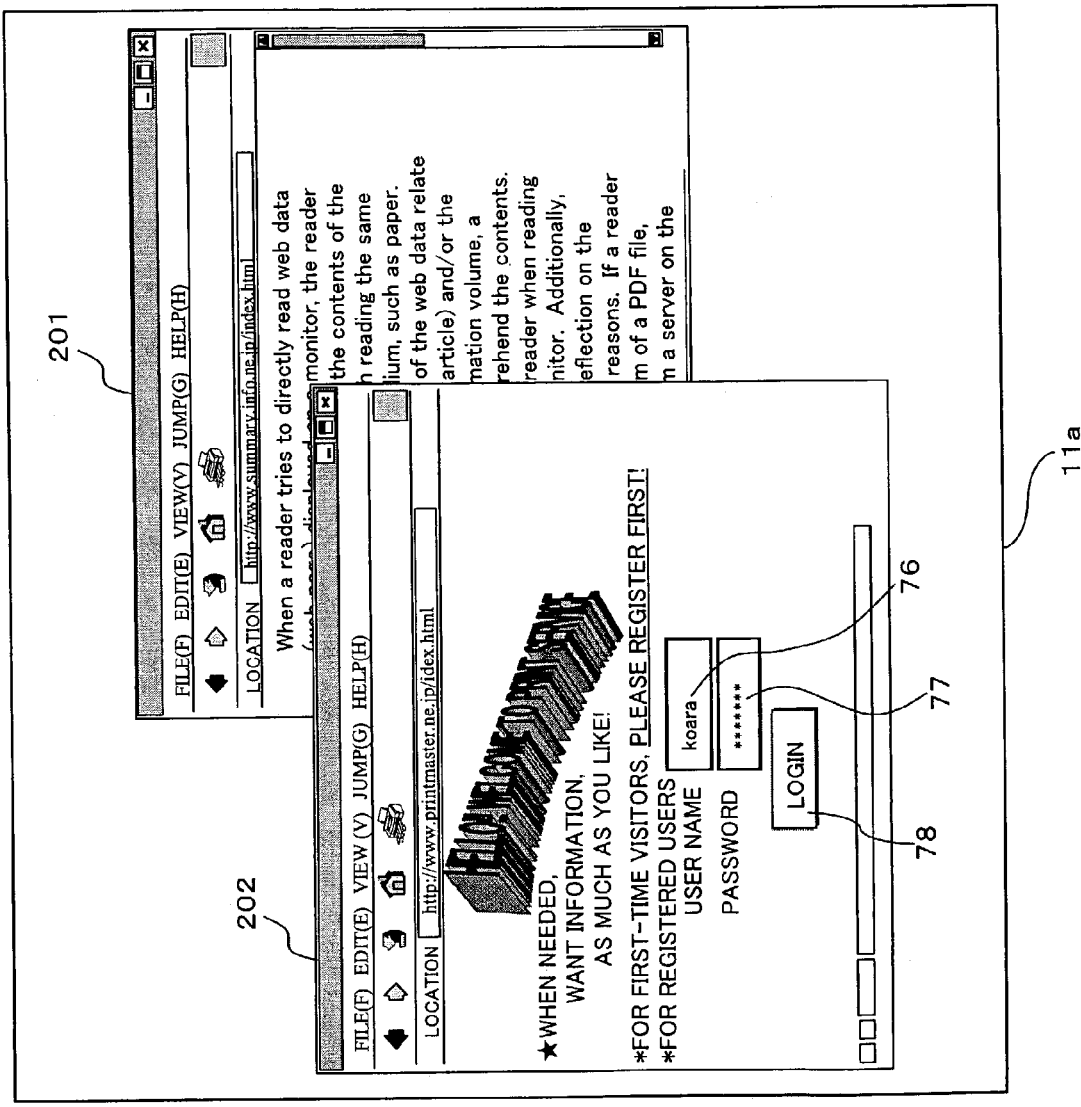
FIG. 15 is a diagram illustrating an example of a display on a monitor of an information terminal.
Figure 16:
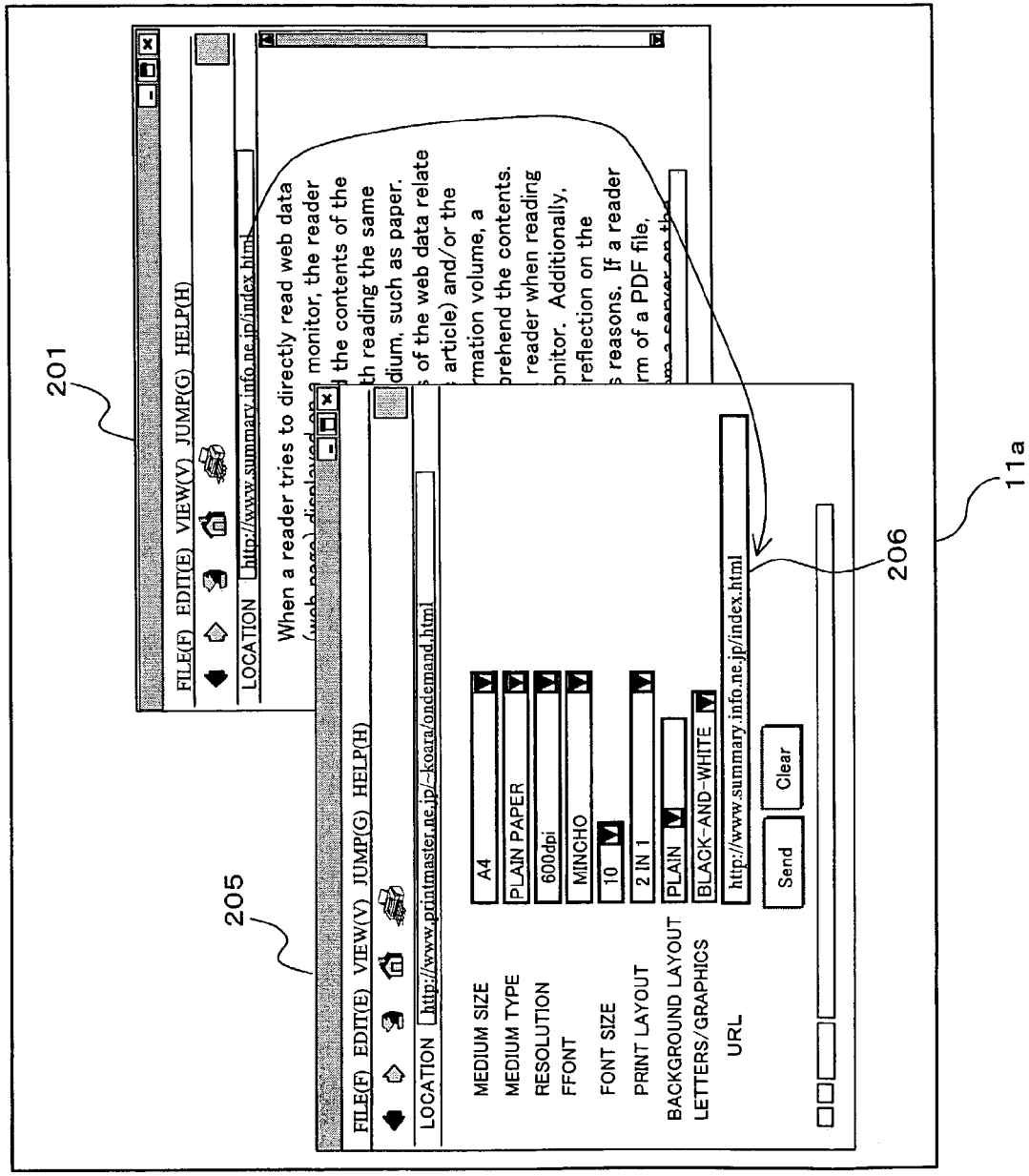
FIG. 16 is a diagram illustrating an example of a display on the monitor of the information terminal.

The apparatus (print controlling server system 101, print executing server system 104) for controlling outputting of web data according to the embodiment of the present invention has the above-mentioned configuration. A succession of procedural steps respectively performed by print controlling server system 101, print executing server system 104, and information providing server system 103 will now be described according to FIG. 14 with reference to FIGS. 15 and 16. FIGS. 15 and 16 respectively show examples of displays on monitor 11a of information terminal 11.

Numbers (1 to 13) on the left side of FIG. 14 represent a chronological order in which processes are performed.

First of all, a user uses information terminal 11 in arbitrary browsing client system 102 to browse a web page from a plurality of web pages provided by information providing server system 103 (chronological order 1) and decides to print the web page.

Upon making the decision to print, the user accesses a web page provided by print controlling server system 101.

For example, assuming that the user wishes to print web page 201 shown in FIG. 15, the user displays web page 201 and web page (log-in screen) 202, which is provided by print controlling server system 101 and has been described with reference to FIG. 4, on monitor 11a of information terminal 11.

The user inputs a "user name" that has been already registered into user-name inputting portion 76 and also a "password" that has been already registered corresponding to the "user name" into password inputting portion 77 in the log-in screen and selects the LOGIN button 78 to log in.

Meanwhile, print controlling server system 101 verifies the user (chronological order 2) based on the input user name and password.

Upon completion of the user verification, the user inputs a URL of web page 201 that the user wishes to be printed into URL input portion 206 in addition to various print conditions on web page 205 for a print direction shown in FIG. 16 so that the user issues a direction to print the web page.

The user may directly input the URL of web page 201 that is to be printed into URL input portion 206 using a keyboard or the like, or may copy the URL on web page 201 and then paste the copied URL to URL input portion 206.

Print controlling server system 101 obtains the URL of web page 201 that the user wishes to be printed or the like (chronological order 3) from various kinds of information (direction information of a direction to output web data) input on web page 205 for a print direction.

Print controlling server system 101 obtains the address (shipping address) of the user from the customer information of the user, and selects the print executing server system 104 nearest to the user's shipping address to direct the nearest print executing server system 104 to print web page 201, sending the various kinds of information such as URL input by the user. At that time, the print executing server system 104 regards the received information as a print direction (chronological order 4).

When print executing server system 104 accesses the web data based on the URL, the web data is provided to print executing server system 104 by information providing server system 103 (chronological order 5).

Print executing server system 104 checks the continuity and importance of each web page to which the web page provides a link in the above-described manners, creates print web data consisting of web data that is of benefit to the user and then further stores the created print web data in the form of a web page (chronological order 6).

Print executing server system 104 sends an e-mail address registered in the customer management database of print controlling server system 101 e-mail 73 (see FIG. 13), notifying the URL of converted web data to confirm the contents of the print web data so that the user can confirm an output appearance image of the web data. Upon receipt of e-mail 73 with information terminal 11, the user accesses the URL described in received e-mail 73 to confirm the contents of print image in the form of a web page (chronological order 7).

The user replies to received e-mail 73 or clicks a confirmation button (not shown) set on the print web page in order to notify print executing server system 104 of the result of the user's confirmation so as to direct print executing server system 104 to execute printing.

At that time, if the user judges that the confirmed print image includes unnecessary web data, the user may delete the unnecessary web data from the print web data. Conversely, if the user judges that the print image does not include necessary web data, the user may add the necessary web data into the print web data. Further, the user may notify such a wish to delete/add to print executing server system 104 thereby causing the print executing server system 104 to perform the deletion/addition.

Print executing server system 104 receives a confirming notification (confirmation) from the user (chronological order 8) and then prints the print web data (chronological order 9). Further, print executing server system 104 dispatches the printed object to the user and thereby the user receives the printed object (chronological order 10).

Upon completion of the dispatch, print executing server system 104 sends print controlling server system 101 a completion notification and then print controlling server system 101 acknowledges the notification. Meanwhile, print executing server system 104 notifies the user of the delivery due date (chronological order 11).

After that, print controlling server system 101 issues a payment application figuring on the delivery due date to the user so that the payment application arrives at the user after the delivery due date. After the user receives the payment application, the user arranges the payment in a predetermined manner (chronological order 12). The agent that runs print controlling server system 101 pays the operating entity of print executing server system 104 for the use of printer 15 (chronological order 13).

Next, functional configuration of an apparatus for controlling outputting of web data according to the embodiment of the present invention will now be described with reference to FIG. 1.

Apparatus 1 for controlling outputting of web data controls output of web data processed into a web page provided on Internet 100 from an output device (e.g. printer 15).

As shown in FIG. 1, apparatus 1 for controlling outputting of web data comprises receiving section 2, web data obtaining section 3, output data creating section 4, output controlling section 5, output appearance image confirming section 6 and output specification determining section 7.

Receiving section 2 receives direction information (such as the URL of web data) of a direction to output web data, which direction information has been issued by a user, and print controlling server system 101 serves to function as receiving section 2.

Web data obtaining section 3 obtains the web data processed into a web page which the user wishes to output on the basis of the direction information received by receiving section 2. Print controlling server system 101 serves to function as web data obtaining section 3.

Output data creating section 4 creates output data by extracting beneficial web data that is of benefit to the user from the obtained web data. Additionally, output data creating section 4 includes page continuity checking section 41 to check whether or not there is at least one web page having continuity with respect to the web page that the user wishes to output and thereby creates the output data by extracting the web page having continuity, as beneficial web data, on the basis of the result of the search performed by page continuity checking section 41.

Output data creating section 4 further includes link importance checking section 42 to check whether or not each of the web pages linked to the web page that the user wishes to output is important and thereby creates the output data by extracting one or more important, web pages as the beneficial web data on the basis of the result of the checking performed by link importance checking section 42.

Print executing server system 104 serves to function as output data creating section 4, page continuity checking section 41 and link importance checking section 42.

Output controlling section 5 controls the output device (printer 15) to output the output data created by output data creating section 4.

Output appearance image confirming section 6 confirms the appearance image of the output data, prior to the outputting of the output data from the output device (printer 15), using the output data, which has been created by output data creating section 4. Print executing server system 104 and information terminal 11 of browsing client system 102 function as output appearance image confirming section 6.

Output specification determining section 7 determines a specification to output the output data in accordance with the direction information received by receiving section 2, and print controlling server system 101 functions as output specification determining section 7.

As mentioned above, with the web-data outputting system including print controlling server system 101 of the embodiment of the present invention, it is possible to determine settings for printing of web data at the request of a user, in other words, according to the object orientation of the user whereupon it is possible for the user to obtain only that information required by the user as demand arises. Advantageously, the user can acquire the printed object without stress.

Since the user can decide desired print conditions (a specification to output), the user can acquire a print object of web data in a desired form. A user can further confirm an appearance image of the output data in the form of web data on information terminal 11 and thereby also can acquire the print object of web data in a desired form. As a result, the user can grasp the printing result in advance whereupon it is economical because web data that the user does not whish to be output is not printed.

In addition, even if browsing client system 102 is equipped with no printer, print web data can be printed.

The present invention should by no means be limited to the aforementioned embodiment, however various modifications can be suggested without departing from the gist of the present invention.

The output device of the above embodiment may be a printing machine (a printer) arranged in a computer system, but the output device should be by no means limited to a printing machine. Alternatively, the output device may be storage such as a MO drive, a CD-R/RW drive, a DAT drive a ZIP drive or a hard disk drive, or another input/output device of a computer system, such as a scanner and a digital camera.

Print controlling server system 101 and print executing server system 104 of the above embodiment share various functions. The various functions should be by no means limited to being realized as the embodiment. Alternatively, the various functions may be performed by a single apparatus (e.g., a server), or may be shared by three or more apparatuses (e.g., servers or printer servers).

Further, in the above embodiment, after print executing server system 104 finishes a print operation, print controlling server system 101 requests a user to pay for printing and pays the operating entity of print executing server system 104 for the use of printer 15, although the present invention should by no means be limited to this. Alternatively, a settlement agent interposed between print controlling server system 101 and print executing server system 104 or the user may make payment, and such payments are executed by electronic account settlements, credit card settlements or the like.

Still further, a web page that is of benefit to a user is one or more web pages (link-destination web pages) to which the web page that the user wishes to output provides links and which has relationships (1) to (3) with the print-directed web page in the above embodiment. A manner of determining a beneficial web page should by no means be limited to that of the embodiment, and alternatively, a beneficial web page may be defined in terms of other relationships.

Still further, the importance of a web page is determined by comparing the number of appearances of a particular key word in a web page that a user wishes to printed with that in the link-destination web page, although the present invention should by no means be limited to this. Alternatively, importance may be determined by calculating a ratio (the number of appearances of a key word/the number of entire words) between the key word and then entire words in the source of each web page and then comparing the two ratios.

It is possible for those skilled in the art to realize the present invention with reference to the disclosure of the embodiment of the present invention.

INDUSTRIAL APPLICABILITY

As mentioned above, an apparatus for controlling outputting of web data and a method for outputting web data of the present invention advantageously output web data that is processed into a web page provided on the Internet from a web-data output device, and are especially suitable for printing web pages.

What is claimed is:

1. An apparatus for controlling outputting of web data, which is processed into a web page provided on the Internet, from an output device, said apparatus comprising:

a receiving section (2) for receiving direction information of a direction to output web data, which direction information has been issued by a user with inputting a URL of a web page;

a web data obtaining section (3) for obtaining the web data that is processed into the web page of the URL inputted by the user on the basis of said direction information received in said receiving section (2);

an output data creating section (4) for creating output data by extracting beneficial web data which beneficial web data is one or more web page linked to the web page of the web data obtained by said web data obtaining section (3) and is of benefit to the user;

and an output controlling section (5) for controlling the output device to output the output data created by said output data creating section; wherein said output data creating section (4) comprises a link importance checking section (42) for checking whether or not one or more web pages linked to the first-named web page of the URL inputted by the user are important on the basis of the number of appearances of a keyword in said one or more web pages and the number of appearances of the keyword in the first-named web page and creates the output data by extracting one or more web pages, as the beneficial web data, which are linked to the first-named web page and which are determined to be important on the basis of the result of the checking performed by said link importance checking section (42);

wherein said output data creating section (4) creates a list of URLs of web pages which are among the one or more web pages linked to the first-named web page and which are other than last-named one or more web pages serving as the beneficial web data, the list being included in the output data.

2. An apparatus for controlling outputting of web data according to claim 1, wherein said output data creating section (4) comprises a page continuity checking section (41) for checking whether or not there is at least one web page that is continuous with the first-named web page of the URL inputted by the user and creates the output data by extracting at least one web page, as the beneficial web data, that is continuous with the first-named web page on the basis of the result of the checking performed by said page continuity checking section (41).

3. An apparatus for controlling outputting of web data according to claim 1 or 2, further comprising an output appearance image confirming section (6) for confirming the appearance image of the output data, prior to the outputting of the output data from the output device, using the output data created by said output-data creating section (4).

4. An apparatus for controlling outputting of web data according to claim 1 or 2, further comprising an output specification determining section (7) for determining a specification to output the output data in accordance with said direction information received by the receiving section (2).

5. An apparatus for controlling outputting of web data according to claim 1 or 2, wherein the output device is a printing machine.

6. A method for outputting web data, which is processed into a web page provided on the Internet, from an output device, said step comprising the steps of:

receiving direction information of a direction to output the web data, which direction information has been issued by a user with inputting a URL of a web page;

obtaining the web data that is processed into the web page of the URL inputted by the user on the basis of said direction information received in said step of receiving;

creating output data by extracting beneficial web data which beneficial web data is one or more web page linked to the web page of the web data obtained in said step of obtaining and is of benefit to the user;

outputting the output data created in said step of creating from the output device; and checking importance of one or more web pages linked to the first-named web page of the URL inputted by the user on the basis of the number of appearances of a keyword in said one or more web pages and the number of appearances of the keyword in the first-named web page, wherein said step of creating is performed by extracting one or more web pages, as the beneficial web data, which are linked to the first-named web page and which are determined to have high importance on the basis of the result of said step of checking on importance, and by creating a list of URLs of web pages which are among the one or more web pages linked to the first-named web page and which are other than last-named one or more web pages serving as the beneficial web data, the list being included in the output data.

7. A method for outputting web data according to claim 6, further comprising the step of checking whether or not there is at least one web page that is continuous with the first-named web page, which the user has directed to be output, wherein said step of creating is performed by extracting at least one web page, as the beneficial web data, that is continuous with the first-named web page on the basis of the result of the step of checking on continuity.

8. A method for outputting web data according to claim 6 or 7, further comprising the step of, prior to said step of outputting, confirming the appearance image of the output data using the output data created in said step of creating.

9. A method for outputting web data according to claim 6 or 7, further comprising the step of determining a specification to output the output data in accordance with said direction information received in said step of receiving.

* * * * *